Dec. 8, 1936.  N. C. SCHELLENGER ET AL  2,063,343
CONTROL DEVICE
Filed Nov. 13, 1933     4 Sheets-Sheet 1
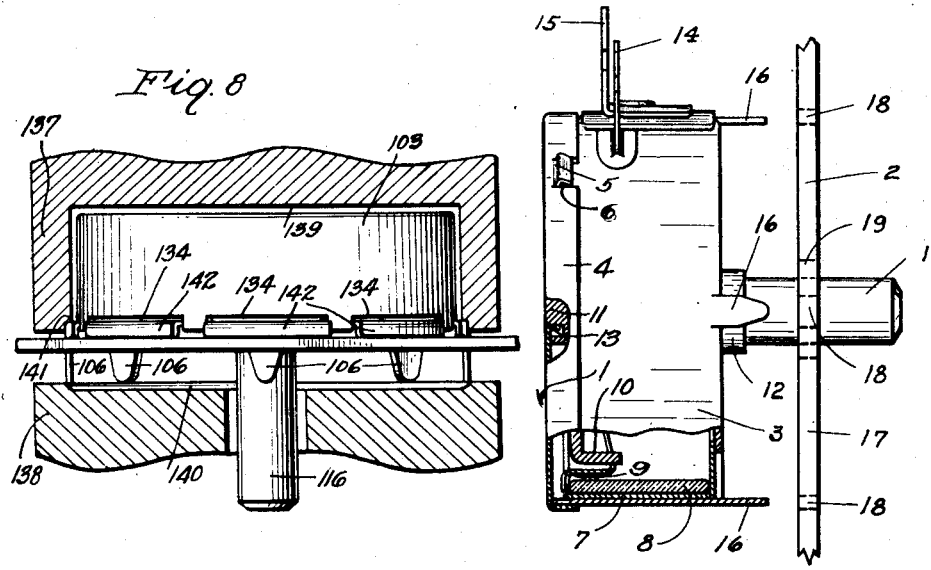
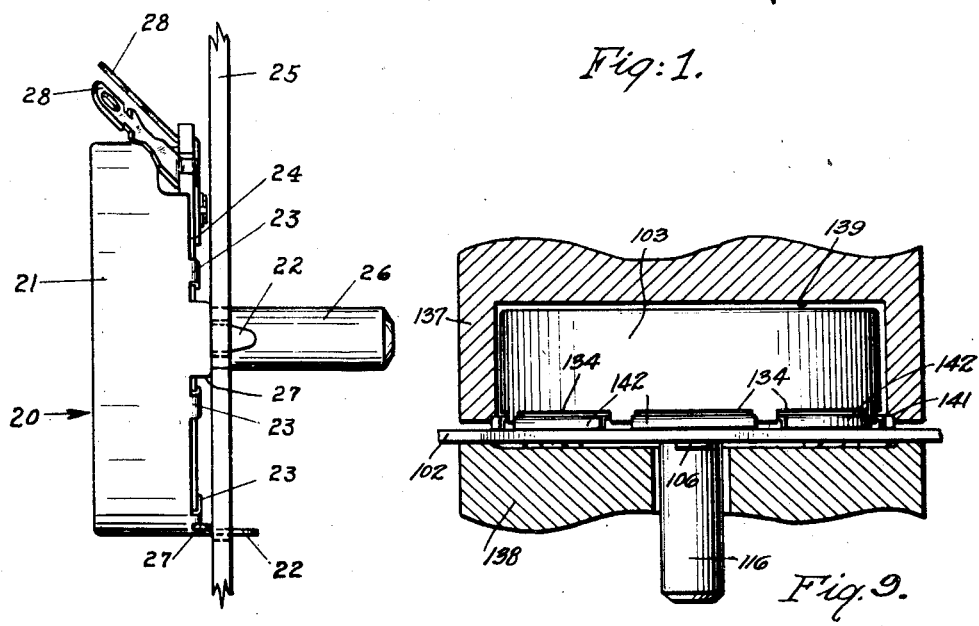
Inventors:
Newton C. Schellenger.
Mervin B. Arisman.
By: Charles H. Beardsley
Att'y.

Dec. 8, 1936.  N. C. SCHELLENGER ET AL  2,063,343
CONTROL DEVICE
Filed Nov. 13, 1933   4 Sheets-Sheet 2

Inventors.
Newton C. Schellenger.
Mervin B Arisman.
By: Charles H. Beardsley
Att'y:

Dec. 8, 1936.  N. C. SCHELLENGER ET AL  2,063,343
CONTROL DEVICE
Filed Nov. 13, 1933  4 Sheets-Sheet 3
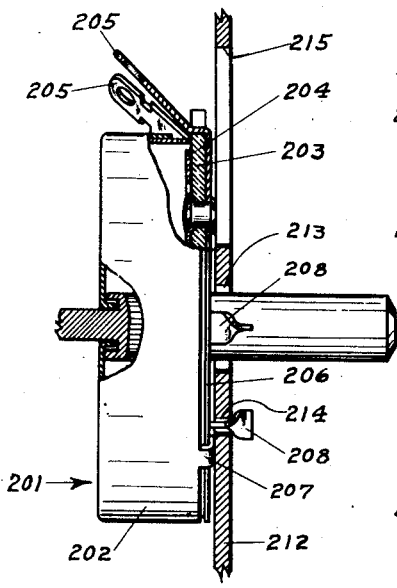
Fig:10.
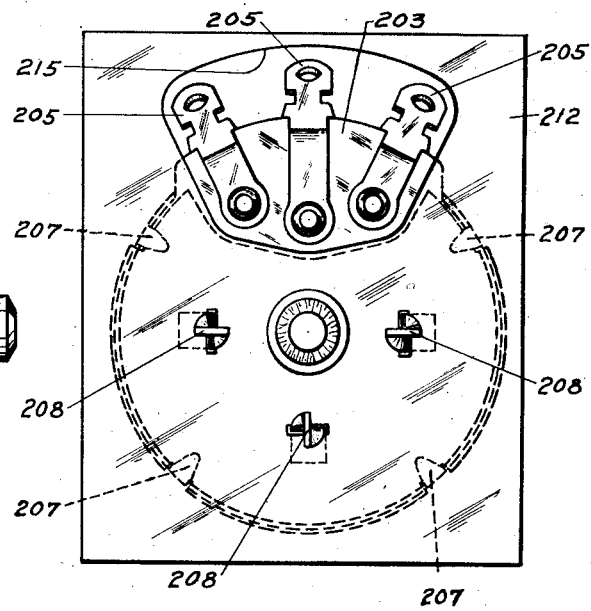
Fig:11.
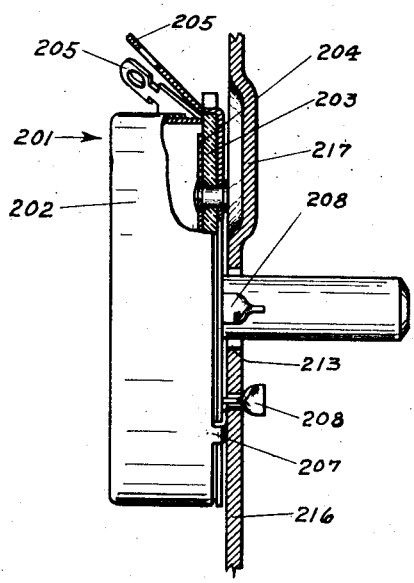
Fig:12.
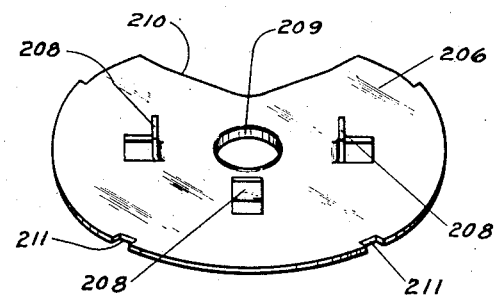
Fig:13.
Inventors.
Newton C. Schellenger.
Mervin B. Arisman.
By: Charles H. Beardsley
Att'y.

Dec. 8, 1936.　　N. C. SCHELLENGER ET AL　　2,063,343
CONTROL DEVICE
Filed Nov. 13, 1933　　4 Sheets-Sheet 4
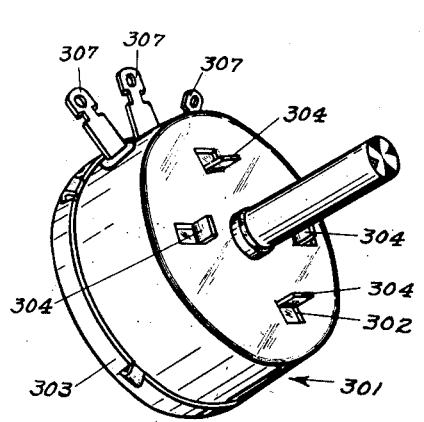
Fig:14.
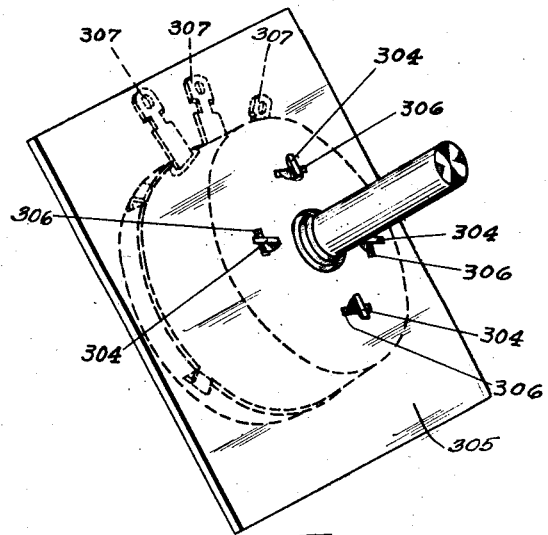
Fig:15.
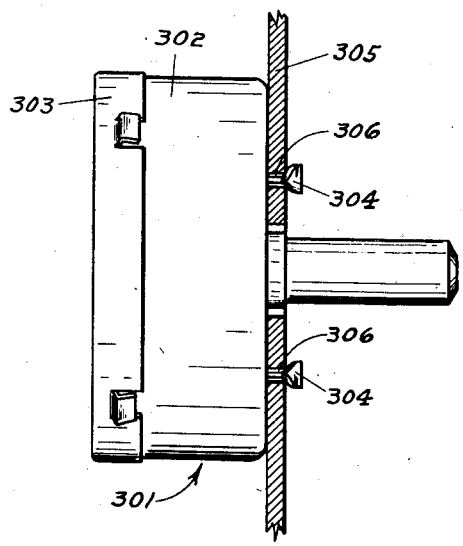
Fig:16.
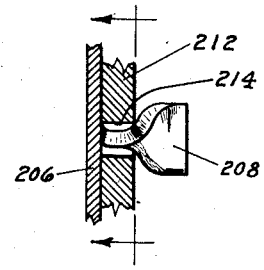
Fig:17.
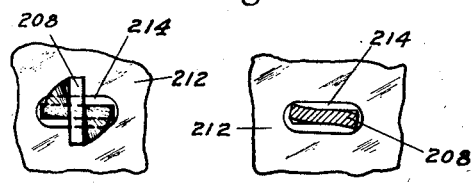
Fig:18.　　Fig:19.
Inventors.
Newton C. Schellenger.
Mervin B. Arisman.
By: Charles H. Beardsley
Atty.

Patented Dec. 8, 1936

2,063,343

UNITED STATES PATENT OFFICE 2,063,343

CONTROL DEVICE

Newton C. Schellenger and Mervin B. Arisman, Elkhart, Ind., assignors to Chicago Telephone Supply Co., Elkhart, Ind., a corporation of Indiana Application November 13, 1933, Serial No. 697,718

10 Claims. (Cl. 201—55)

This invention relates to control devices and particularly to housing and mounting arrangements therefor.

More particularly, the invention relates to variable resistance devices employed in volume control units and tone control units for radio sets, such devices including a resistance element and a cooperating contactor enclosed in a housing usually having a cylindrical shape and adapted to be mounted on the rear face of a supporting member, or panel member having perforations extending therethrough to receive mounting ears extending from the unit and bent over to secure the unit on the panel member.

Heretofore, control units have been secured to a panel member either by screws engaging the casing of the control unit and the panel member, or by a threaded bushing (commonly known as a "thimble bushing") carrying the control unit and projecting through a perforation in the panel member to receive a mounting nut which clamps the control unit against the panel member; the bushing also serves to journal the actuating shaft of the variable resistance device. The method most commonly practiced has employed the threaded bushing but this has been subject to certain disadvantages and has caused certain difficulties in practice. In the threaded bushing type of mounting some additional provision must be made to prevent rotation of the control unit on the panel member as the shaft is rotated, particularly when the stops limiting the rotation are reached; the threaded bushing is expensive to manufacture and assemble; the bushing takes valuable space when assembled in the unit; and an undue strain is placed on the panel member due to the one point support of the unit. Furthermore, the mounting nut and its washer are not only expensive to provide, but are likely to be lost before the control unit is mounted.

In the co-pending application of Newton C. Schellenger, Serial No. 671,031, filed May 15, 1933, of which this application is in part a continuation, there is disclosed an arrangement for mounting the unit on a panel member, in which arrangement a plurality of ears are formed on the periphery of the casing member which houses the variable resistance device, the ears being adapted to project through perforations in the panel member and being secured against the front wall of the panel member. This arrangement has numerous advantages over the prior devices, such as, simplicity, inexpensiveness of manufacture and assembly, ruggedness, compactness, and firmness of support provided. The arrangement also provides advantages in the construction of the variable resistance device itself, such as, firm bearing for the operating shaft and simplicity of construction of the members.

The present application relates to a mounting arrangement similar to that disclosed in the aforementioned application and in addition to certain extensions and modifications of the inventive concept disclosed in the aforementioned application.

One form of the invention disclosed herein follows the teachings of the aforementioned copending application and comprises a variable resistance device having a casing member provided with integral ears extending therefrom, which ears project through perforations in the supporting member or panel and are bent over against the panel to clinch the casing member thereto.

In another form of the invention disclosed herein a substantially planar mounting member is provided having a diameter slightly greater than the diameter of the principal casing member and a series of circumferentially disposed mounting ears; the mounting member is secured to the casing in a manner to provide a shoulder projecting radially beyond the periphery of the casing. In such an arrangement, the mounting ears are formed on a member having substantially no depth and hence the ears can easily be accurately positioned and the shoulder provided by the mounting member serves as a seat for the die employed in bending over the mounting ears when the variable resistance device is mounted.

In another form of the present invention the ears are struck from portions of the casing near the central portion of the blank and are twisted into engagement with the supporting member and hence no substantial pressure need be applied to the casing during the mounting operation.

One of the objects of the invention is the provision of a variable resistance device which is simple and rugged, inexpensive to manufacture and which may be simply and strongly mounted on a panel mounting member.

Another object of the invention is the provision of a variable resistance device having a drawn metallic casing which may be inexpensively and accurately formed and readily attached to a panel mounting member.

Another object of the invention is the provision of a variable resistance device having bendable elements for mounting the device on a panel mounting member and an arrangement for bending over the mounting element against the panel mounting member to clamp the device thereto.

Another object of the invention is the provision of an arrangement for mounting a variable resistance device on a supporting member, which arrangement is easy and inexpensive to manufacture and which renders the mounting operation simple and expeditious.

Another object of the invention is the provision of a variable resistance device housing which may readily be attached to a supporting member with a minimum of difficulty or expense and with the minimum possibility of damage to the variable resistance device or the supporting member.

Other objects of the invention will appear from the following description taken in connection with the accompanying drawings wherein:

Fig. 1 is a side elevational view, partially in cross-section, showing a variable resistance device and supporting member embodying the invention;

Fig. 2 is a side elevational view showing the invention as applied to another form of housing for the variable resistance device;

Figs. 8 and 9 are elevational views, partially in cross-section, showing the device and the die for bending over the mounting ears, the die being shown fragmentarily and in partly open and in closed position respectively;

Figs. 10 and 11 are side elevational, partially sectional, and front elevational views respectively showing a modified form of the invention;

Fig. 12 is a side elevational view, partially in cross-section showing another modified form;

Fig. 13 is an oblique view showing the mounting member employed in the forms of the invention shown in Figs. 10 and 12;

Figs. 14 and 15 are oblique views showing a still further modification unmounted and mounted respectively;

Fig. 16 is a side elevational view of the structure shown in Fig. 15; and

Figs. 17 to 19 are enlarged fragmentary views showing a detail of construction.

Figure 3:
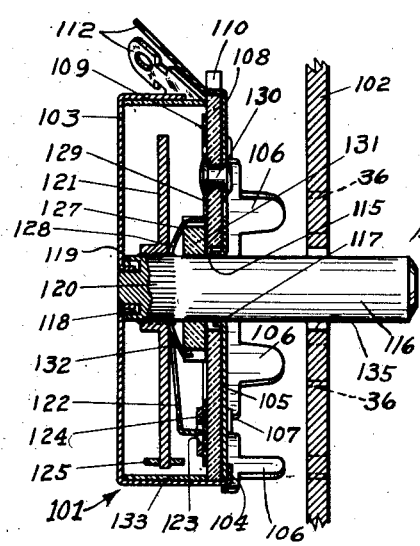
Fig. 3 is a side elevational view, partially in cross-section, showing a variable resistance device and supporting member therefor embodying another form of the invention.
Figure 6:
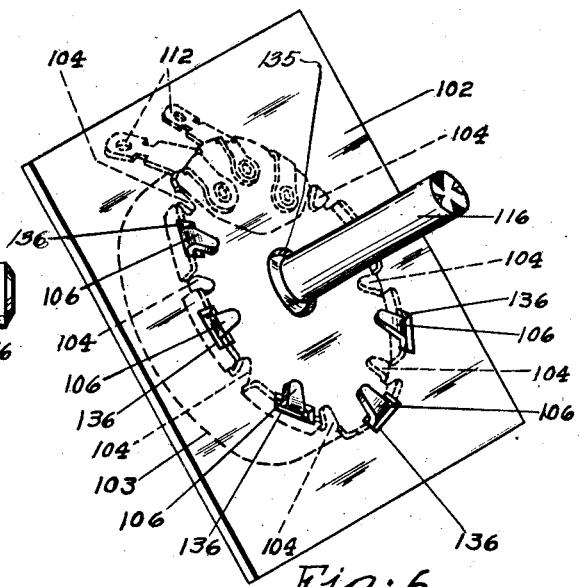
Fig. 6 is an oblique front view showing a portion of the supporting member with the variable resistance device.
Figure 4:
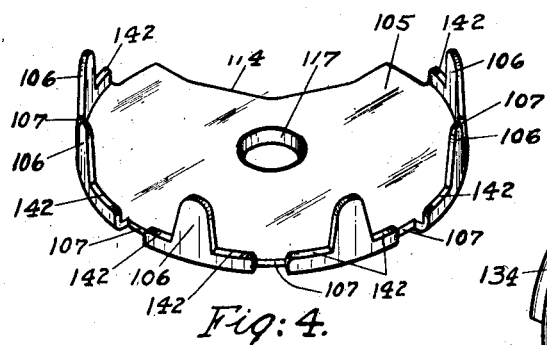
Figs. 4 and 5 are oblique views showing the mounting member and casing member respectively.

Referring more in detail to the drawings, Fig. 1 shows a variable resistance device 1 in position to be secured to a supporting member 2, for example, the sub-panel of a radio chassis.

The variable resistance device 1 comprises a drawn or die pressed cupped casing member 3 and a drawn cover member 4 adapted to telescope over the end of the cupped casing member 3 and secured thereto by integral tongues 5 on the cover member 4 bent over lugs 6 on the cupped casing member 3. Mounted in the cupped casing member 3 and insulated therefrom by an insulating strip 7 is a resistance element 8 on which bears a contactor 9 driven by an actuator 10 carried by a shaft 11. The shaft 11 is journaled in hardened bearings 12, 13 formed integral with the respective casing members 3, 4 during the drawing operation. The bearings are hardened by a cold working of these portions of the casing during the forming of the casing members but may alternatively be hardened by a separate operation. The ends of the resistance element 8 are electrically connected to two terminals 14 respectively, (one of which is shown) and the contactor 9 is connected to another terminal 15 whereby the variable resistance device 1 can be connected in an electrical circuit (not shown).

Struck from the material forming the bottom wall of the cupped casing member 3 are a plurality of mounting ears 16 which are spaced circumferentially about the bottom wall and constitute extensions of the side wall of the casing member 3. The supporting member 2 is provided with perforations 18, 19 spaced to receive the ears 16 and the shaft 11 respectively, as shown in Fig. 1. When the variable resistance device 1 is mounted, the ears 16 enter their respective perforations 18 and are bent over against the front wall of the supporting member 2 to clamp the variable resistance device 1 thereto.

In Fig. 2 is shown an analogous arrangement for mounting a variable resistance device of slightly different construction.

In this embodiment of the invention, the variable resistance device 20 comprises a cupped casing member 21 preferably formed by drawing, and provided with integral mounting ears 22 constituting circumferentially spaced extensions of the side wall portion of the cupped casing member 21. Also formed integrally with the cupped casing member 21 is a plurality of ears 23 which are bent over against a base member 24 which closes the end of the cupped casing member 21.

The variable resistance device 20 is mounted in a manner similar to that described in connection with the device shown in Fig. 1, the supporting member 25 being perforated to receive the mounting ears 22 and the shaft 26, the ears 22 being adapted to be bent over against the supporting member 25. In this form of the invention, the mounting ears 22 are provided with shoulder portions 27 which serve to space the variable resistance device 20 from the supporting member 25 thus preventing grounding of the terminals 28 on the supporting member 25.

Fig. 3 shows a variable resistance device 101 in position to be mounted on a supporting member 102, the variable resistance device 101 comprising a drawn or die pressed cupped casing member 103 having a plurality of integral securing ears 104 extending in the direction of the side wall of the casing member 103 which latter is secured by the ears 104 to a substantially circular drawn or die pressed mounting member 105. The mounting member 105 has substantially the form of a disk with a series of spaced mounting ears 106 extending perpendicularly from the periphery and slots 107 intermediate the mounting ears 106, the slots 107 being of a size to receive the securing ears 104 of the casing member 103 which latter ears 104 are bent over against the exterior face of the mounting member 105.

A substantially circular base 108 formed of insulating material carries a flat resistance element 109 of the type comprising a paper strip having a carbonaceous conducting coating thereon. The base 108 has a laterally projecting portion 110 provided with three slots 111 in which are locked terminal members 112 the outer two of which are electrically connected to the resistance element 109 by rivets (not shown). The casing member 103 has a cut-away portion 113 to receive the projecting portion 110 of the base 108 and the terminals 112; the mounting member 105 likewise has a cut-out portion 114 to accommodate the terminals 112 thus permitting the mounting member 105 to lie flat against the base 108 and preventing contact between the terminals 112 and the mounting member 105 when the latter is secured to the casing member 103.

Extending axially through the base 108 is a central perforation 115 through which projects a shaft 116 journaled in a bearing constituted by an integral collar 117 turned up from the mounting member 105 and entering the perforation 115 in the base 108; the end of the shaft 116 has a circular slot 118 which engages an integral collar 119 turned up from the casing member 103 to serve as a bearing for the shaft 116; the slot 118 may be filled with a lubricating material.

The portion 120 of the shaft 116 adjacent the end is serrated and carries a metallic plate-like actuator 121 which is attached to the shaft 116, the actuator being serrated and having a press fit with the shaft 116. Riveted or otherwise suitably attached to the plate is a contactor arm 122 having a tip entering a perforation 123 in a disk-shaped contact shoe 124 to hold the shoe 124 in contact with the resistance element 109. The peripheral portion of the actuator 121 carries an insulating stop member 125 positioned to strike alternately against inturned lug portions 126 of the casing member 103 to limit the movement of the actuator 121 in either direction of rotation thereof by the shaft 116.

A current collector 127 formed of spring material has a warped annular portion 128 surrounding the shaft 116 and bearing against the surface of the actuator 121 and a tail-like extension 129 electrically connected to the center one of the terminals 112 by a rivet 130. The current collector 127 is insulated from the shaft 116 and maintained in position by an insulating collar 131 having slotted portions engaging respectively the tail portion 129 and a downturned lug portion 132 diametrically opposite the tail portion 129.

A rigid circular strip 133 of insulating material, for example impregnated paper, is disposed around the side walls of the casing member 103 to serve the plural functions of insulating the live elements from the housing, spacing the casing members and closing the cut-away portion.

The manner of assembly of the device is as follows:

The shaft 116 and its associated members are assembled on the mounting member 105 in a manner which will be apparent from the drawings, and the insulating strip 133 having been positioned in the casing 103, the mounting member, together with the shaft 116 and associated elements, and the casing 103 are assembled and the securing ears 104 are bent over against the base 105 to secure the casing and the mounting member together.

Figure 7:
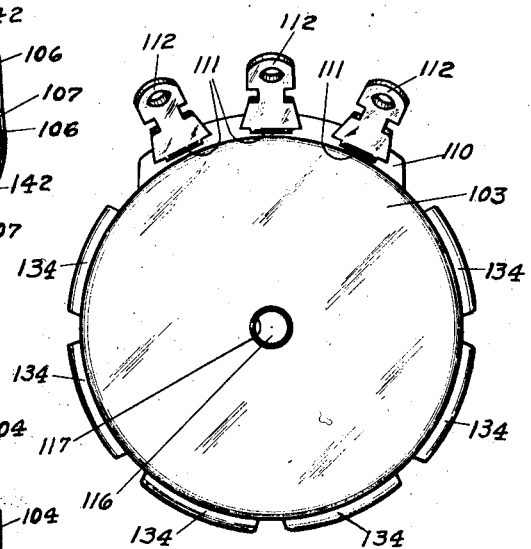
Fig. 7 is a top plan view of the variable resistance device attached to the mounting member.
Figure 5:
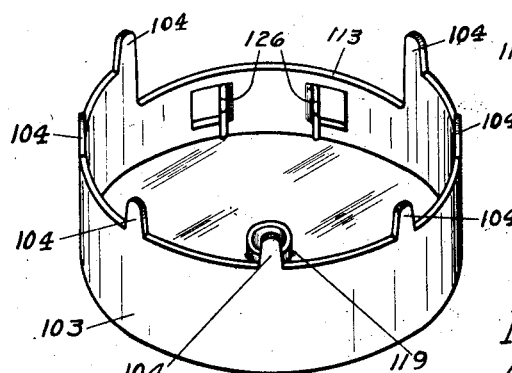

As will be seen from the drawings, particularly Figs. 7, 8 and 9, the diameter of the mounting member 105 is slightly greater than the diameter of the casing member 103, the peripheral portion of the mounting member 105 constituting a series of laterally extending flanges 134 or shoulders providing a series of seats, the purpose of which will hereinafter be explained.

The shaft 116 and the mounting ears 106 are inserted in a circular perforation 135 and a series of circularly disposed slots 136 respectively in the supporting member 102. A die having two principal members 137, 138 is positioned to receive the device (as shown in Figs. 8 and 9) with a relatively deep depression 139 in one of the die members 137 receiving the casing 103 and a relatively shallow depression 140 in the other die member 138 receiving the mounting ears 106.

The first die member 137 is provided with a shoulder portion 141 engaging the seats constituted by the laterally extending flanges 134 whereby all of the pressure exerted by the die member 137 is applied to the flanges 134. As the die members 137, 138 are moved together the curved sides of the shallow depression 140 bear against the outer sides of the ends of the mounting ears 106 to bend the latter inwardly and against the face of the supporting member 102.

As will be seen from the drawings, the die member 137 exerts no pressure upon the casing member 103 and hence there is no strain on or deformation of the casing member 103. Also, it will be obvious that the force exerted on the mounting member 105 by the die member 137 is applied at the peripheral portion of the mounting member 105 substantially along a line extending longitudinally of the mounting ears 106, whereby the mounting member 105 is subjected to substantially no bending stress at the peripheral portion.

The mounting ears 106 are formed with the shoulder portions 142 which extend peripherally around the mounting member 105 between the slots 107. These shoulder portions 142 provide a series of seats of substantial area firmly abutting the supporting member 102 and serve to space the exterior face of the base 108 from the supporting member 102 whereby the terminals 112 will not contact the supporting member 102 and ground the connections thereto. The shoulder portions 142 also provide a seat of substantial area for the shoulder portion 141 of the die member 137 whereby the unit pressure is less than would be the case if the narrow portion of the ears 106 sprung immediately from the principal portion of the mounting member 105.

Figs. 10 and 11 show still another embodiment of the invention wherein the variable resistance device 201 comprises a cupped casing member 202, a base 203 supporting a flat resistance element 204 and a set of terminals 205. A flat mounting member 206 is held against the base 203 by securing ears 207 formed integral with the cupped casing member 202 and bent over against the mounting member 206 to secure the base 203 over the end of the casing 202 to close the end thereof.

The mounting member 206, shown by itself in Fig. 13, comprises a flat plate having mounting ears 208 struck from the material constituting the intermediate portion and an inturned, integral bearing portion 209 adapted to enter a perforation (not shown) in the base 203 in a manner similar to that shown in Fig. 3. The mounting member 206 is provided with a cut-out portion 210 which permits the member 206 to lie flat against the base 203 without contacting the terminals 205 and a series of slots 211 to receive the securing ears 207 thereby preventing rotation of the mounting member 206. The supporting member 212 is provided with a perforation 213 to receive the shaft and slotted perforations 214 for the mounting ears 208 and is also provided with an enlarged perforation 215 having such a shape that it will receive the terminals 205 when the device 201 lies flat against the supporting member 212 and such that it will permit access to the free ends of the terminals 205 from the front side of the supporting member 212.

In this form of the invention the device 201 is clamped to the supporting member 212 by twisting the ears 208 through 90° of rotation, at least one of the ears 208 preferably being twisted in a different direction of rotation than the remaining ears 208. As will be seen from Figs. 17 to 19, the twisting of the ear 208 causes the forward corners to bite into opposite curved portions of the walls of the slot 214 thereby securely locking the ear 208 against all movement with respect to the slotted supporting member 212. The slot 214 may be formed sufficiently larger than the ear 208 to permit easy entrance of the ear 208 since to obtain a satisfactory locking action it is only necessary that the corners of the ear 208 engage the curved portions of the slot walls when the ear is twisted.

The twisting of the ears 208 may be accomplished in a very simple manner and without the application of any substantial pressure in the casing member. Preferably the twisting is done by the use of a hand tool (not shown) provided with a slot adapted to receive the ear. A 90° twist of the tool bends the ear and draws the member to which the ear is attached into firm abutment with the slotted supporting member.

In Fig. 12 is shown a variable resistance device similar to that shown in Fig. 10 and mounted similarly except that instead of a perforated supporting member, a supporting member 216 is provided with a recessed portion 217 having a shape similar to that of the perforation. Since the supporting member 216 is imperforate in front of the terminals 205, the latter are well shielded against any undesirable electrostatic or electro-magnetic disturbances likely to cause undesirable noises in the variable resistance device 201.

The twisted form of ear may also be applied to the type of variable resistance device in which the closed end of a cupped casing abuts the supporting member. This form is shown in Figs. 14 to 16 wherein a variable resistance device 301 comprises a cupped casing member 302 and a cover member 303 telescoped thereover constitute the casing for the device. The cupped casing member 302 has struck from the material constituting its intermediate portion, a plurality of mounting ears 304.

The device 301 is mounted as above described, on a supporting member 305 suitably perforated and the ears 304 entering the respective perforations 306 and being twisted about their respective center lines to clinch the casing member 302 against the supporting member 305.

The variable resistance device 301 will be seen to be flat against the supporting member 305; inasmuch as the terminals 307 extend from the side wall of the casing member 302 and are thus spaced from the supporting member 305, no perforation, or indentation, or other provision for preventing grounding of the terminals 307 on the supporting member 305 need be made.

It will now be apparent that the invention provides a novel mounting means for variable resistance devices of the general type herein disclosed. It should be obvious that the invention is not limited to the specific type of device herein shown but may be practiced in connection with any variable resistance device or other device having a similar construction. It is further to be noted that the invention may be applied to variable resistance devices having other arrangements and types of resistance elements and contactors and that the invention may be applied also to multiple unit devices and variable resistance devices combined with other devices such as switches.

We claim:

1. In combination with a variable resistance device having a cupped housing, a base plate positioned in the open face of said housing, a metallic mounting member positioned adjacent the external surface of said base plate, means on said housing for securing said base plate and said mounting member to said housing, and ears formed on said mounting member and extending therefrom for securing said variable resistance device to a supporting element.

2. In combination with a variable resistance device having a cupped housing and a base plate positioned in the open face of said housing, a metallic mounting member positioned adjacent the external surface of said base plate, means on said housing for securing said base plate and mounting member to said housing, aligned journal bearings in said housing and mounting member, an actuating shaft for said variable resistance device mounted for rotation in said journal bearings, and ears formed on said mounting member and extending therefrom for securing said variable resistance device to a supporting element.

3. A variable resistance device having in combination, a cupped housing, ears extending from the free edge of said cupped housing, a mounting member, notches in the marginal edge of said mounting member, said ears projecting through said notches to secure the mounting member to said housing, spaced portions extending perpendicularly from the plane of said mounting member, mounting ears on said spaced portions and stop shoulders adjacent said ears for mounting said variable resistance device in spaced relationship with a supporting element.

4. A variable resistance device having in combination, a housing, a mounting member secured to one end of said housing, said mounting member provided with portions extending laterally beyond the periphery of said housing, off-set mounting ears extending perpendicularly from the said laterally extending portions, whereby said ears are adapted to project through a supporting element with the off-set portions thereof spacing the variable resistance device from the supporting element.

5. In combination with a supporting member, a variable resistance device having a cupped housing, a closure member for the open face of said housing, ears extending from the free edge of said housing and bent to secure the closure member to said housing, a plurality of broad extensions of the free edge of said housing, ears formed on said broad extensions leaving shoulder portions adjacent the ears, said last-named ears projecting through an aperture in said supporting member with the said shoulder portions abutting against said supporting member to secure the variable resistance device thereto in spaced relationship.

6. A variable resistance device having in combination, a cupped housing, a base plate positioned in the open face of said housing, a metallic mounting member positioned adjacent the external surface of said base plate, integral means on said housing for securing said base plate and mounting member to said housing, a shaft for actuating said variable resistance device, aligned journal bearings for said shaft in the housing and mounting member, and integral fastening means on said mounting member and extending therefrom for securing said variable resistance device to a supporting element.

7. In a variable resistance device, in combination a casing housing the resistance, a mounting member substantially covering a face of the housing and having portions extending beyond the edge of the face of the casing, said portions being bent away from the casing to form narrow shoulders closely adjacent the edge of the casing, and securing ears extending from the edges of said extended portions.

8. In a variable resistance device, in combination a casing housing the resistance, a mounting member substantially covering a face of the housing and having portions extending beyond the edge of the face of the casing, ears on the casing extending between said portions to secure the casing to the mounting member, and securing ears extending from the edges of said extended portions of the mounting member.

9. In a variable resistance device, in combination a casing housing the resistance, a mounting member substantially covering a face of the housing and having portions extending beyond the edge of the face of the casing, the ends of said extended portions being bent perpendicular to the mounting member away from the casing, said ends comprising securing ears, and spacing shoulders adjacent the ears.

10. In a variable resistance device, in combination a casing housing the resistance, a mounting member substantially covering a face of the housing and having portions extending beyond the edge of the face of the casing, the ends of said extended portions being bent perpendicular to the mounting member away from the casing, said ends comprising securing ears, and spacing shoulders adjacent the ears, and ears on the periphery of the casing extending between the extended portions of the mounting member and bent against the face of the mounting member to secure the casing to the mounting member.

NEWTON C. SCHELLENGER.
MERVIN B. ARISMAN.